United States Patent [19]

Tanaka et al.

[11] 4,071,732

[45] Jan. 31, 1978

[54] METHOD OF LARGE CURRENT GAS SHIELDED ARC WELDING

[75] Inventors: Jinkichi Tanaka; Itaru Watanabe, both of Yokohama, Japan

[73] Assignee: Nippon Kokan Kabushiki Kaisha, Toyko, Japan

[21] Appl. No.: 634,322

[22] Filed: Nov. 21, 1975

[30] Foreign Application Priority Data

Nov. 27, 1974 Japan .................................. 49-135559

[51] Int. Cl.² .............................................. B23K 9/16
[52] U.S. Cl. .................................... 219/137 R; 219/74
[58] Field of Search .......... 219/137 WM, 137 R, 130, 219/73, 74, 73 A, 73 R

[56] References Cited

U.S. PATENT DOCUMENTS

| | | | |
|---|---|---|---|
| 3,185,812 | 5/1965 | Richter et al. .......... | 219/137 WM X |
| 3,325,626 | 6/1967 | Sargent .................... | 219/74 X |
| 3,368,887 | 2/1968 | Enis et al. ............... | 219/137 WM X |
| 3,704,358 | 11/1972 | Saito et al. .............. | 219/137 R X |
| 3,803,381 | 4/1974 | Bernard et al. ......... | 219/74 X |
| 4,020,312 | 4/1977 | Araki et al. ............. | 219/73 R X |

*Primary Examiner*—J. V. Truhe
*Assistant Examiner*—N. D. Herkamp
*Attorney, Agent, or Firm*—Haseltine, Lake & Waters

[57] ABSTRACT

A method of large current gas shielded arc welding wherein the welding is accomplished at high speed by a single electrode or tandem sequence electrodes in an atmosphere of a mixed shielding gas comprising essentially of an inert gas with an addition of less than 30% of carbon dioxide gas or less than 5% of oxygen and supplied at an overall flow rate of 50 to 200 l/min by using large diameter solid wire consumable electrodes of low alloy steel material with a diameter of 3.0 to 6.4 mm $\phi$ under the following conditions: welding speed 300 to 1500 mm/min; welding current, 600 to 1500 amp; and arc voltage, 23 to 36 volts. With this method, the welding of steel can be accomplished at high speeds with a reduced heat input and an improved efficiency and it is particularly well suited for the welding of open tubes for very low temperature line pipe which must retain a high degree of toughness at very low temperatures.

4 Claims, 11 Drawing Figures

(a)

(b)

(c)

(a)

(b)     (c)

METHOD OF LARGE CURRENT GAS SHIELDED ARC WELDING

BACKGROUND OF THE INVENTION

The present invention relates generally to gas shielded arc welding processes, and more particularly the invention relates to an improved gas shielded arc welding method well suited for the welding of the straight or helical seam of an open pipe for the manufacture of a very low temperature line pipe as well as the welding of other materials which must retain high toughness values at low temperatures.

Generally, large diameter pipe has been made by the UOE process, spiral process or the like on a mass production basis in a factory and therefore there has been a strong demand for a welding process of greater operating speeds and efficiency. Under these circumstances, the tandem sequence submerged arc welding process has been used as the process for the regular welding of the straight or helical seam of an open tube formed by the UOE or spiral process. This welding process may be generally considered as a welding process which is particularly adapted for the production of large diameter pipe since the process employs a large welding heat input which in turn results in a deep weld penetration and hence an excellent welding efficiency as compared with the other arc welding processes such as the inert gas metal arc welding process (hereinafter simply referred to as the MIG process) and the $CO_2$ gas shielded arc welding process. Recently, there has been an increasing demand for the production of thick-wall (e.g. thicker than 25 mm) line pipe for low temperature applications. In contrast to the ordinary large diameter pipe, most of such line pipes are used for the purposes of conveying, under high pressured and at high speeds close to the velocity of sound, natural gases, etc. from very cold districts and consequently very high toughness at low temperatures must be ensured in the base metal and the weld zone. Moreover, there are many cases where the hardness of the weld zone (including the base metal) is limited to low values, namely, below 260 for Hv 1 Kg in order to prevent the occurrence of stress corrosion cracking due to the presence of sulfides. The above-mentioned tandem sequence large heat input submerged arc welding process may be advantageously utilized for the manufacture of such very low temperature line pipe to obtain satisfactory results in terms of welding efficiency. However, if this welding is used for the welding of the pipes with wall thickness of 25 mm, the welding is effected with a large heat input as high as 65000 Joule/cm with the result that a considerable deterioration of the properties, particularly the impact properties in the heat affected zone adjacent to the bond of the weld zone, takes place and this phenomenon is particularly noted in the properties of high quality steels such as low temperature steels. Therefore, the ordinary large heat input submerged arc welding process is not capable of ensuring the required properties in the welded materials of the above-mentioned type.

While, with the submerged arc welding process, the above-mentioned problem of deteriorated properties can be overcome only by limiting its welding heat input, the welding with such a low heat input ruins the characteristic features of the process and reduces its welding efficiency considerably, thus making it improper as the process for the manufacture of large diameter pipes. In other words, this makes it impossible to use the welding process which has heretofore been used customarily for the welding of large diameter pipes to provide the single layer, single pass welding on each of the inner and outer surfaces of a steel pipe and it is thus imperative to use the multi-layer welding which in turn results in a reduced welding efficiency. In addition, the multi-layer welding inevitably requires the flux removing operation after each pass and this also is directly reflected in the reduction of the welding efficiency. Another disadvantage is that to ensure the desired toughness at low temperatures, the submerged arc welding involves the use of a high basic flux independently of the welding heat input. Such a flux shows a high viscosity at elevated temperatures and essentially ill-suited for the high speed welding and it also frequently gives rise to welding defects such as the inclusion of the flux and slag.

In view of these deficiencies, the submerged arc welding process is not a well suited method for the welding of large diameter, thick wall open tubes for the manufacture of very low temperature line pipes, and therefore the use of the above-mentioned MIG welding process or the $CO_2$ gas welding process may be considered as an alternative method. However, in these welding processes, the welding is usually accomplished in a gaseous atmosphere consisting principally of an inert gas such as argon or helium, or carbon dioxide gas by operating a small diameter wire of less than 2.4 mm$\phi$ with welding currents of less than 500 amp. With these welding processes, while it is possible to avoid the problem of deterioration of the properties in the weld zone by virtue of the reduced welding heat input, excepting the cases where the pieces to be welded are sheet steels, the maximum possible welding speed of these welding processes is up to 500 mm/min, namely, the welding efficiency is as low as two or three times that of the manual welding at the maximum. Consequently, the MIG welding process and the $CO_2$ welding process cannot be adapted for any more than the tack welding of the seam at the best and these processes also fall short of the high efficiency welding processes adapted for mass production purposes. In an attempt to improve on such inefficiency, a welding method has been proposed in which four electrodes each consisting of a small diameter wire (1.6 mm$\phi$) are arranged in a straight row along the weld line to accomplish the welding continuously. Even with this process, the welding efficiency still remains at a low level and thus it is impossible to turn the small current MIG welding process with small diameter wire into a practical method that can replace the tandem sequence, submerged arc welding process in terms of welding efficiency by merely increasing the number of electrodes used in the MIG welding process. Although a still another welding process adapted for the welding of very high tension steels and employing a large diameter solid wire of above 3.0 mm$\phi$ has been proposed, this process is also disadvantageous in that the maximum possible welding speed is limited to 250 mm/min with a resultant inefficiency and moreover the control of arc voltages is limited within 24 to 26 volts with a resultant instability of arc. Still further disadvantage is that this welding process takes the form of single electrode welding and therefore it also cannot be adapted for mass production purposes.

SUMMARY OF THE INVENTION

It is an object of the present invention to provide a novel method of large current gas shielded arc welding which is capable of welding steels with very low welding heat input requirements while ensuring a very high welding efficiency and high operating speeds.

It is another object of the present invention to provide a novel method of large current gas shielded arc welding which is well suited for the welding of open tubes of large diameter pipes such as very low temperature line pipes which must retain high toughness at low temperatures.

In accordance with the present invention, there is thus provided a method of large current gas shielded arc welding of steel wherein the high speed arc welding at welding speeds between 300 and 1,500 mm/min is accomplished in an atmosphere of a mixed shielding gas comprising essentially an inert gas such as pure argon or helium with an addition of less than 30% of carbon dioxide or less than 5% of oxygen and supplied at an overall flow rate between 50 and 200 l/min by using a consumable electrode consisting of a large diameter solid wire of low alloy steel material with a diameter of 3.0 to 6.4 mm$\phi$ with large welding currents between 600 and 1,500 amp and arc voltages between 23 and 36 volts.

According to another form of the method of large current gas shielded arc welding of steel according to the invention, the automatic arc welding of steel is accomplished under the same conditions as mentioned above by using a plurality of large diameter solid wire consumable electrodes each consisting of a low alloy steel material with a diameter between 3.0 and 6.4 mm$\phi$ and adjusting the interelectrode distance within 10 and 100 cm.

DETAILED DESCRIPTION OF THE INVENTION

Figure 1:
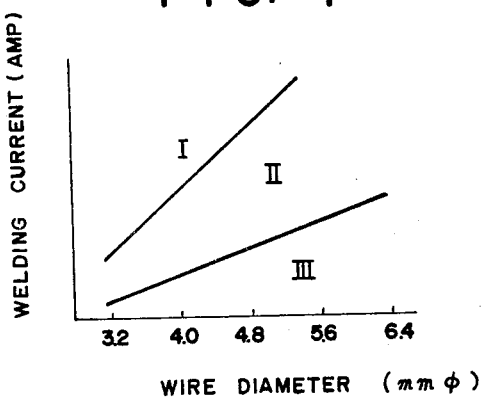
FIG. 1 is a diagram showing the arcing phenomena determined by the wire diameter and the welding current with the arc voltage being fixed.

The method of large current gas shielded arc welding according to the invention will now be described in greater detail in comparison with the ordinary submerged arc welding process and the MIG or $CO_2$ gas welding process with small electrode wire.

A feature of the present invention resides in that the consumable electrode used is a large diameter solid wire consisting of a low alloy steel material with a diameter between 3.6 and 6.4 mm$\phi$. This diameter is considerably great in consideration of the fact that the diameter of the electrode wire used in the ordinary MIG or $CO_2$ welding process is less than 2.4 mm$\phi$. The welding method of this invention employs such large diameter solid wire electrode for the following reasons. Namely, when the welding speed is increased in the arc welding, due to the relative relation between the speed of movement of arc (i.e., heat source) and the speed of heat conduction in the plate to be welded, the preheating effect of the base metal by the heat conduction tends to be lost and hence the melting of the base metal is limited to that portion of the base metal which contacts with the arc directly. Consequently, the area of the molten base metal is reduced considerably and at the same time there results a rapid change in the temperature gradient between the molten base metal portion and its boundary zone. Thus, the molten metal fails to be joined with the base metal satisfactorily and the resulting bead tends to be formed into a convex shape. As a result, where the higher welding speeds are to be used, it is essential that the heat energy of the arc is increased and at the same time the spread of the arc is increased to increase the area of the molten base metal and decrease the temperature gradient between the arc and its surrounding zone. In this case, if a small diameter wire is used as the electrode and the welding current is increased to increase the current density of the arc column, the diameter of the arc is reduced considerably and thus the arc exhibits a so-called hard arc condition. Consequently, while a deep melting of the base metal is ensured, the transmission of the heat to the adjoining zone is insufficient and there is no spread of the heat thus causing the width of the bead to become smaller. In other words, the high speed welding with the small diameter wire and high welding current is possible only when the plate thickness of pieces to be welded is small and therefore the two dimensional heat transfer is easily obtained. Thus, the high speed welding of thick plates requires not only the use of higher welding currents but also the use of an increased arc heat energy and an increased arc spread. In view of this fact, in accordance with the present invention the high welding currents are used and at the same time a large diameter wire is used as the electrode to prevent the pinch effect on the arc column from increasing due to the increased current density. In other words, a comparison between the case where the welding current of 320 amp is supplied to the electrode wire of 1.6 mm$\phi$ and the case where the welding current of 800 amp is supplied to the electrode wire of 4.0 mm$\phi$ shows that the ratio between the resulting welding current densities is 1:0.4, namely, the welding current density is relatively small when the large current is supplied to the large diameter wire but the spread of the arc increases. That is, it is evident that the diameter of the electrode wire has a considerable effect on the spread of the arc. While the diameter of such large diameter wire is determined in consideration of the welding currents and welding speeds, since the welding current of above 650 amp is required for the high speed welding of over 600 mm/min which is necessary for the welding of line pipes, etc., the field of applications of the invention, the lower limit of the wire diameter is set above 3.0 mm$\phi$. While the wire diameter is greater the better, the upper limit is set at 6.4 m$\phi$ in consideration of the rigidity of the wire and the relative difficulty in handling the wire.

Another feature of the present invention is that while the method of this invention employs as the consumable electrode the large diameter solid wire consisting of low alloy steel material with a diameter between 3.0 and 6.4 mm$\phi$ and supplies a high welding current to the electrode, it is essential to keep the welding current within a specified range which ensures a satisfactory arc depending on the wire diameter. FIG. 1 is a diagram showing the roughly classified regions of the arcing phenomena or the stabilities of the arc dependent on the wire diameter and the welding current with the arc voltage being fixed. In the Figure, where the welding current is excessively high relative to the wire diameter as in the region I, the molten metal is blown off by a strong plasma gas flow in the direction to the rear relative to the direction of movement of welding and thus no stable weld can be obtained due to the arc becoming excessively short and the resulting high heat energy deeply melts and gouges the base metal. On the other hand, where the welding current is excessively low relative to the wire diameter as shown in the region III, the arc length is increased and the arc becomes unstable. Consequently, the weld penetration is reduced and it becomes non-uniform with the resulting danger of causing a violent spattering phenomenon and hence interrupting the arc. The region II between the regions I and III indicated a range of welding currents which provides a stable arcing phenomenon and the resulting sound weld bead. While the extent of this range varies depending on the arc voltage and the welding speed, the inventors, etc., have discovered that in the gas shielded arc welding of steel the correct welding currents are above 600 amp for the wire of 3.0 mm$\phi$ and 1500 amp for the wire of 6.4 mm$\phi$, and the welding currents within 600 and 1,500 amp are proper for other wire diameters.

However, in order to make the effect of the invention appropriate, the above-mentioned use of the large diameter wire as the consumable electrode and the selection of a high current range for the welding currents are still insufficient to accomplish the desired arc welding.

In other words, still another feature of the invention resides in that the arc welding is accomplished in an atmosphere of a specific mixed shielding gas comprising essentially of an inert gas such as pure argon or helium with an addition of less than 30% of carbon dioxide gas or less than 5% of oxygen and supplied at an overall flow rate between 50 and 200 l/min. These conditions are selected on the following ground. Namely, when the gas shielded arc welding is accomplished simply by using the large diameter wire and the high welding currents, the intensity of the arc is high and the temperature of the outer portion of the arc is raised. Consequently, at the instant that the base metal contacts the outer portion of the arc, the base metal is melted and gouged deeply. While this may be advantageous in the case of the high temperature welding where no preheating effect is provided, the arc becomes unstable so that it is disturbed even by a small variation in the current or voltage and moreover many other abnormal conditions are caused such as the disturbance, boiling, evaporation, etc., of the molten metal in the molten pool thus causing in the weld bead a waviness which is called a humping phenomenon and there is also the danger of causing undercuts. This tendency increases as the welding speed is increased. In the past, as a means of preventing the occurrence of such irregularities, the length of the wire projected from the contact tip end constituting the feeding point has been reduced as far as possible to reduce the arc voltage and thereby to minimize the arc length. While this is a means of preventing the disturbance of the molten metal beneath the arc which is caused by the unstable arc and the resulting rapid variation of the surface conditions, more specifically, a means of limiting the setting of the arc voltage to within the maximum variation range of about 2 volts, excepting the tack welding of the straight seam, it is difficult to set the arc voltage within such a narrow range in the case of the regular welding of the seam and thus it is impossible to cope with such external factors which are unavoidably encountered in the ordinary welding operations.

Under these circumstance, the inventors, etc., have conducted various experiments on the phenomena of unstable arc caused by the high welding currents in the gas shielded arc welding and have discovered the following fact on the basis of which the welding according to the method of this invention is accomplished under the above-mentioned specific shielding gas atmosphere conditions. In other words, it has been found that the main cause of unstable arc in the high current range is the thermal expansion of the arc due to the increased current. More specifically, as the temperature of the arc increases, the lower the potential gradient of the arc is which is determined by the types of gases present in the space where the arc is being generated, the more the arc is expanded and the arc length is increased thus making the arc unstable. This may be prevented by cooling the outer periphery of the arc to confine the arc or alternately a pressure may be externally applied to the arc to balance against the internal pressure of the arc to thereby stabilize the arc. More specifically, this may be realized by increasing the shielding gas pressure and the flow rate of the shielding gas and introducing a small amount of an active gas into the inert shielding gas. With this method, it is possible to obtain a stable arc even with a wider range of voltage variation. In other words, while some variation is inevitable depending on the size of the welding wire used, with the wire diameters above 3.0 mm$\phi$, it is possible to ensure a highly stable arc even when the arc voltage is varied within the range between 23 and 36 volts. Specifically, the minimum flow rate of 50 l/min is necessary for the shielding gas in order to ensure a stable arc with the high welding currents of above 600 amp and the main pressure of the shielding gas should preferably be selected 3 Kg/cm$^2$. The lower limit of 50 l/min. is selected on the ground that if the welding current becomes higher than 500 amp when the shielding gas flow rate is lower than 50 l/min, the resulting increase in the velocity of plasma gas flow breaks the shield thus introducing the surrounding air into the arc and thereby causing a violent spattering phenomenon, whereas if the welding current increases further and exceeds 600 amp, violent boiling and evaporation of the molten metal due to oxidation reactions take place in the molten pool thus making it impossible to control the arc voltage.

Figure 2:
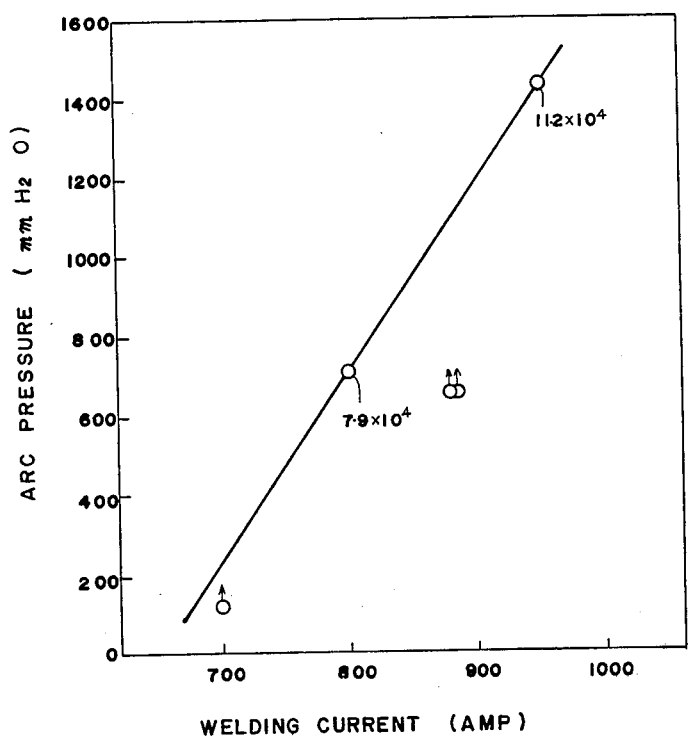
FIG. 2(a) is a diagram showing the actual measurements of the arc pressure and the flow rate of arc plasma gas determined by the welding current with the arc voltage being fixed.
FIG. 2(b) is a diagram showing the relationship between the shielding gas flow rate, the arc plasma diameter and the occurrence of defects in bead.
Figure 2:
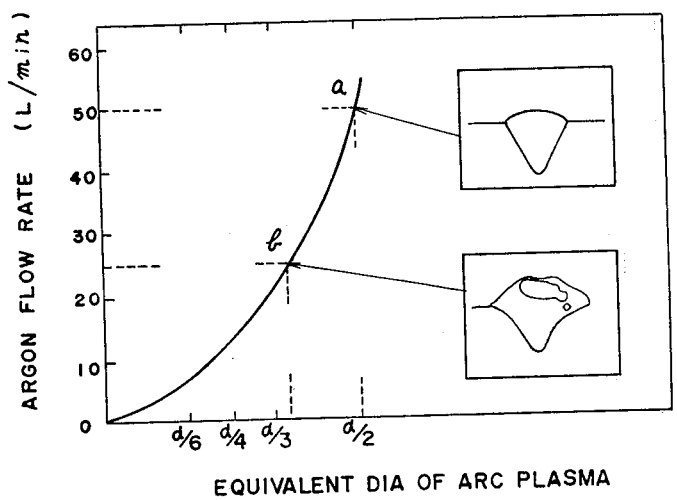

FIG. 2(a) is a diagram showing the arc pressures actually measured in the gas shielded arc welding with the arc voltage fixed at 30 volts and the welding current varied and an example of the velocities of the plasma gas flow calculated according to these pressures and currents. In the diagram, the denoted numbers indicate the velocities of the plasma gas flow (in cm/sec). FIG.

2(b) is a diagram showing the relationship between the occurrence of welding defects and the shielding gas requirement calculated on the basis of the equivalent diameters of arc plasma obtained from the velocities of the plasma gas flow according to the experiments of FIG. 2(a) and the diameter of the molten pool (18 mm), in the gas shielded arc welding accomplished under the conditions: arc voltage, 30V; welding current, 800A; and welding speed, 600 mm/min. As regards the occurrence of the bead defects, the sectional view of the molten pool at typical points a and b are schematically shown in the respective small square boxes. FIG. 2(b) also indicates that the flow rate of above 50 l/min is required for the shielding gas. The upper limit of the shielding gas flow rate should be set at 200 l/min. The reason is that if the flow rate exceeds this upper limit, the molten metal is depressed by the gas flow and the gas pressure and thus there is the danger of causing a depression in the central portion of the molten metal and moreover the outer portion of the arc is rapidly cooled and the spread of the heat is lost thus exerting detrimental effects on the high speed welding.

As regards the type of shielding, it is preferable to use a double shielding torch with an after shielding device since the shielding must be provided to completely envelop the arc and maintain a complete shield around the molten metal until the completion of its full solidification. Where a plurality of large diameter solid wires are used as the electrodes, the above-mentioned shielding gas flow rate should be within 50 and 200 l/min. per electrode. However, the amount of the after shielding gas may be increased so far as the increase does not have any detrimental effect on the shielding provided by the torch.

Figure 3:
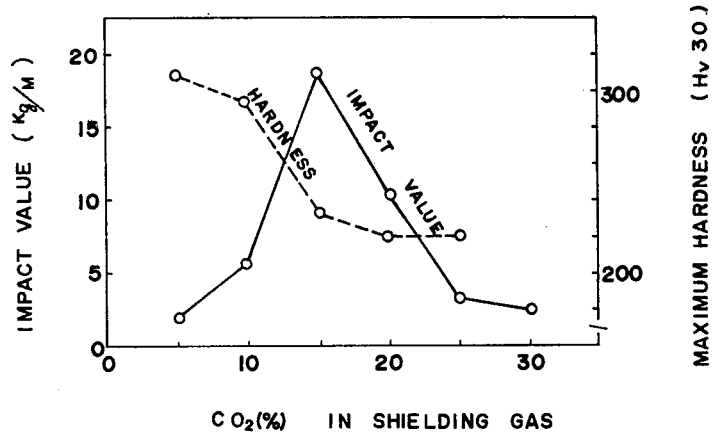
FIG. 3 is a diagram showing the relationship between the amount of carbon dioxide gas introduced into the shielding gas and the impact value and maximum hardness of the weld metal.

The shielding gas should preferably be pure argon to provide a fine finish on the weld bead, and oxygen or carbon dioxide gas should not be introduced in any large amount into the shielding gas since it makes a slag on the surface of the weld bead. However, it is desirable to introduce an active gas up to a certain amount for such purposes as the stabilization of the arc and the prevention of undercuts. The addition of oxygen in amounts above 5% is not preferable since it reacts abnormally with other elements in the molten metal causing abnormal conditions such as boiling and evaporation. On the other hand, carbon dioxide gas has an important bearing on the properties in the weld metal, particularly the impact value and the maximum hardness of the weld metal. The diagram of FIG. 3 shows the relationship between the carbon dioxide gas content of the shielding gas and the impact value and maximum hardness of the weld metal. It will also be seen from FIG. 3 that the introduction of less than 30% of carbon dioxide gas is beneficial. While the introduction of carbon dioxide gas into the shielding gas causes the formation of a slag, if the ratio of the introduced carbon dioxide gas is less than 30%, the resulting slag may be broken into pieces and removed by the strong shielding gas during the welding by completing the after shielding immediately after the slag has floated on the surface of the molten pool.

Still another feature of the present invention is that the arc voltages are limited within a specified range. Although a stable arcing may still be obtained even if the arc voltage is caused to vary by the use of the large diameter wire with the diameter within the specified range, the predetermined high welding currents and the specified high flow rates of the shielding gas as mentioned above, the range of the arc voltages is not indefinite and the arc voltages should range from 23 to 36 volts.

Figure 4:
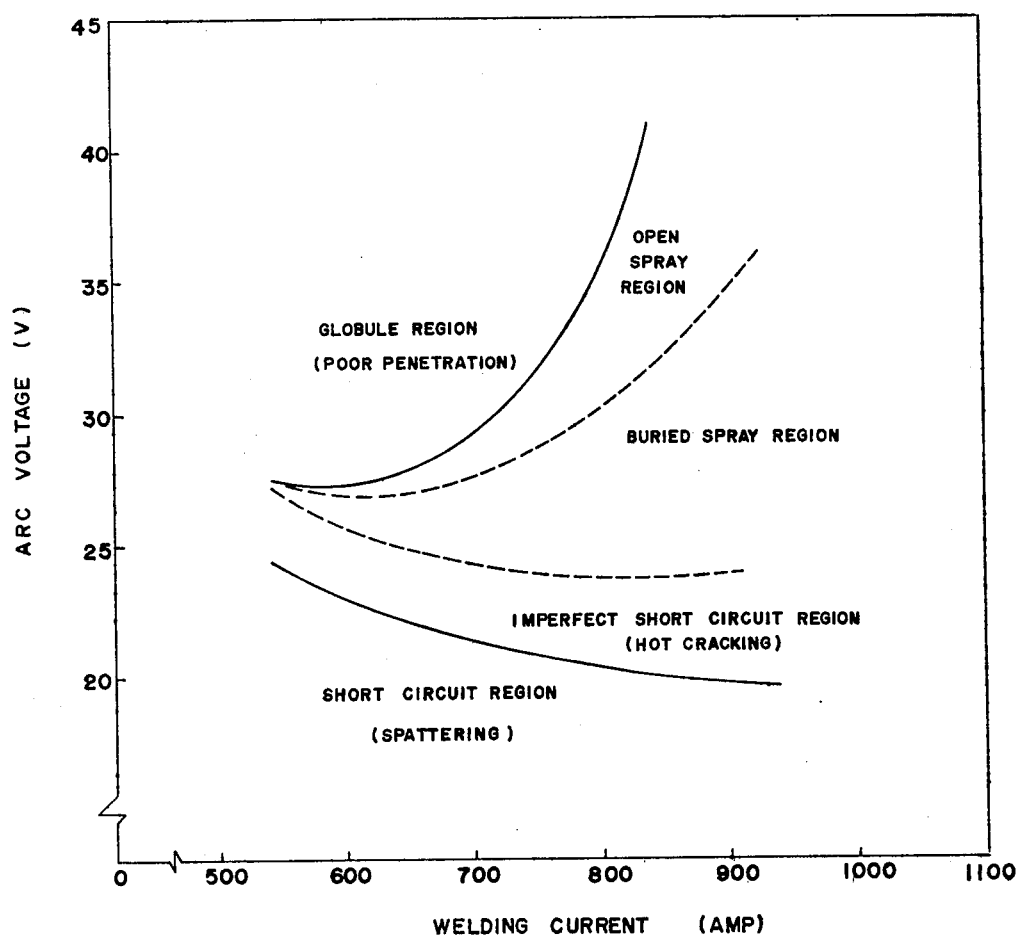
FIG. 4 is a diagram showing the arcing phenomena determined by the arc voltage and the welding current.

The diagram of FIG. 4 shows an example of the relationship between the arc voltage and welding current and the arcing phenomenon in the welding operation accomplished at the welding speed of 600 mm/min using the 15% $CO_2$ shielding gas and the electrode wire with the diameter of 4.0 mm$\phi$. It will be seen from FIG. 4 that when the arc voltage was lower than 23 volts, a violent spattering was caused due to the introduction of carbon dioxide gas into the shielding gas. On the other hand, when the arc voltage exceeded 36 volts, the arc length was increased so that the arc was susceptible to external factors such as the magnetic field and the shape of the molten metal and the arc tended to become unstable. When the arc voltages ranging from 23 to 36 volts were used, a stable spray or pellet arc of excellent quality was obtained with either of the constant current characteristic power supply and the constant voltage characteristic power supply.

With the welding method of this invention, the welding speed may be varied within a wide range of low to high welding speeds. However, in consideration of the regular welding of the seam, the welding speeds greater than 1500 mm/min ruin the effects of the high flow rates of the shielding gas constituting the feature of the invention so that it is impossible to ensure a stable arc and a sound weld bead as well. The investigations made by the inventors, etc., have shown that the proper speed range is practically between 600 and 1200 mm/min. The welding speeds below 300 mm/min increase the welding heat input giving rise to the boiling and evaporation of the molten metal and thereby making the welding difficult.

As regards the welding efficiency, the welding method according to the invention is capable of obtaining high welding speeds and high efficiency which are comparable with those of the conventional tandem sequence, high heat input, submerged arc welding process and moreover the method of this invention can use a lower welding heat input and produce excellent low temperature properties in the weld zone and the welding heat affected zone as well.

While the foregoing description has been made in reference to the arc welding involving the use of a single large electrode, the present invention also comprises a method of automatic gas shielded arc welding wherein at least two electrodes each having the same function as the above-mentioned large diameter electrode are mounted on a welding beam or carriage with the interelectrode distance between the leading and trailing electrodes ranging from about 10 to 100 cm and the welding is effected using the same shielding gas requirements for the respective electrodes and the same conditions for the welding current, arc voltage and welding speed as the previously mentioned ranges.

In other words, where a hardening base metal is used and the groove is filled with the weld metal by the tandem sequence type large current gas shielded arc welding, while there is the possibility of the heat affected zone adjacent to the bond being hardened considerably when the first layer is deposited by the leading electrode on the base metal which has not been preheated, if the plurality of electrodes are arranged with a predetermined interval therebetween within the above-mentioned preset range of distances and the trailing electrode follows the leading electrode, the rate of cooling of the weld metal is considerably reduced at temperatures below a certain temperature determined by the interelectrode distance and consequently the degree of hardening of the heat affected zone may be reduced as compared with that obtained when the weld metal is deposited by the leading electrode alone in the multiple electrode welding with an interelectrode distance outside the above-mentioned distance range. In addition, part of the heat affected zone of the base metal which has been hardened by the effect of heat of the leading electrode is reheated by the trailing electrode and the part is softened by a tempering effect. On the other hand, since the base metal has been preheated by the leading electrode, the rate of cooling from the elevated temperature of the heat affected zone produced by the trailing electrode is retarded and the degree of hardening of the heat affected zone is considerably reduced as compared with that obtained when no preheating is provided.

In other words, it is possible to prevent the hardness from increasing without any deterioration in the impact properties and this is the important feature of the invention. As mentioned earlier, the very low temperature line pipes designed for use in very cold districts are not only required to retain high impact properties at very low temperatures but also required in many cases to limit its hardness to prevent the occurrence of corrosion cracking by sulfides included in materials to be conveyed. This limitation is a very severe one due to the fact that where the impact properties are to be improved from a constitutional point of view, this is frequently realized by the addition of alloying elements which generally result in an increased hardness and that the welding conditions must be selected to use a low welding heat input. However, with the welding method according to the invention wherein the distance between a plurality of large diameter solid wires each consisting of low alloy steel material is varied within 10 and 100 cm and the arc welding is accomplished in an atmosphere of a mixed shielding gas comprising essentially of pure argon with an addition of less than 30% of carbon dioxide gas or less than 5% of oxygen and supplied at an overall flow rate between 50 and 200 l/min by operating the electrodes at high welding currents ranging from 600 to 1,500 amp, arc voltages ranging from 23 to 36 volts and welding speeds ranging from 300 to 1,500 mm/min, the cooling rate of the first pass layer deposited by the leading electrode, the interpass temperature and the area of the deposited layer subject to tempering effects may be adjusted as desired and accurately and in this way the desired impact properties and hardness may be provided in the resulting weld joint. The purpose of determining of the interelectrode distance as mentioned above is to temper the preceeding layer by the trailing electrode and the range of interelectrode distances is limited on the ground that it is preferable for the trailing electrode to pass by the bead formed by the leading electrode after its temperature has dropped below 500° C. The lower limit of the interelectrode distance is set at 10 cm on the ground that if the distance is smaller than the lower limit, the arcs of the respective electrodes interfere with one another thus causing the arcs to disturb, while the upper limit is set at 100 cm on the ground that if the distance greater than this is used, the result is in effect the same as the multi-layer welding and hence the welding efficiency which is a merit of the multiple electrode welding is reduced. There is another operating difficulty in that it is impossible to mount the desired number of electrodes on the same carriage.

Further, the arc welding involving the use of a plurality of large diameter solid wires is highly advantageous in providing improved impact properties in the weld metal. In other word, in accordance with the method of this invention, within the above-mentioned requisite conditions of the invention, two different types of electrode wire may be used for the leading electrode for depositing in the central portion of the groove a weld metal which is diluted with the base metal to a greater extent and the trailing electrode for depositing in the surface portion another weld metal which is diluted with the base metal to a lesser degree or the content of carbon dioxide gas in the shielding gas for the respective electrodes may be varied relative to one another, thereby to adjust the amount of alloying elements in the respective layers of the weld metal. Thus, by properly taking into consideration the rate of dilution with the base metal of the respective layers in the weld metal and the heat cycle, it is possible to obtain the weld metal with the most satisfactory properties. Namely, the welding method of this invention is applicable to the welding of steel tubes for the line pipes of the type described above and the welding of the ordinary thick steel plates as well to produce the weld joint metals of excellent properties.

DESCRIPTION OF THE PREFERRED EMBODIMENTS

The following examples describe in greater detail the welding operation in accordance with the method of this invention.

EXAMPLE 1

The welding was accomplished in accordance with the welding method of this invention, the tandem sequence, high heat input submerged arc welding process and the small wire MIG welding process, respectively. The following Table 1 shows the welding conditions of the respective processes and their welding efficiencies. The welding method of this invention used two electrodes of the tandem sequence type, and all the cases show the results of the experimental productions of large diameter steel tubes for very low temperature line pipes which were actually made in the shop. The material for the steel tubes was 3.5 Ni - Mn - Mo - Cr steel and the material for the wires was Mn - Ni - Mo - Ti - B base material.

Table 1

Figure 5:
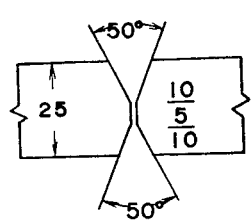
FIGS. 5(a), 5(b) and 5(c) are schematic diagrams showing the groove shapes included in Table 1 showing the welding conditions of Example 1.
Figure 5:
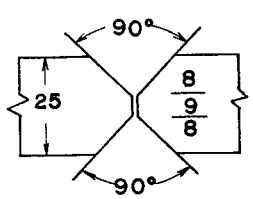
Figure 5:
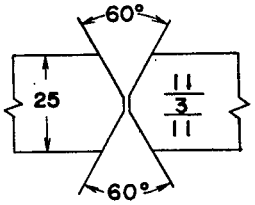

| Welding process | Method of the invention | Conventional method (Tandem sequence submerged arc welding) | Conventional method (Small diameter wire gas shielded arc welding) |
| --- | --- | --- | --- |
| Groove shape | FIG. 5(a) | FIG. 5(b) | FIG. 5(c) |
| Internal volume of groove ($cm^3$/cm) | 0.93 | 1.28 | 1.40 |
| Electrode wire diameter (mm $\phi$) | 4.0 | 4.8 | 1.6 |
| Number of electrodes | Tandem | Tandem | Single |
| Interelectrode distance (mm) | 350 | 90 | — |
| Welding current (Amp) | Leading electrode $\leq$ 820 | Leading electrode 1100 | $\leq$ 320 |

Table 1-continued

| Welding process | Method of the invention | Conventional method (Tandem sequence submerged arc welding) | Conventional method (Small diameter wire gas shielded arc welding) |
|---|---|---|---|
| Arc voltage (Volt) | Trailing electrode ≦ 700 Leading electrode ≦ 31 Trailing electrode ≦ 29 | Trailing electrode 850 Leading electrode 40 Trailing electrode 40 | ≦ 32 |
| Welding speed (mm/min) | 600 | 700 | 300 |
| Number of passes | Each 1 pass on each side, totaling 2 passes | Each 1 pass on each side, totaling 2 passes | Both sides totaling 13 passes |
| Welding input heat (KJ/cm) | Leading electrode ≦ 24 Trailing electrode ≦ 22 | 65 | 18 |
| Shielding | Leading electrode Ar + 15 % $CO_2$ Trailing electrode Ar + 5 % $CO_2$ | High basic fused flux | Ar + 2 % $CO_2$ |
| Comparative welding efficiency taking SAW process as 1 | 0.85 | 1.0 | 0.06 |

It will be seen from Table 1 that the welding efficiency of the method of this invention is much superior to that of the small wire MIG welding process and is so high that it can be fully compared with that of the conventional tandem sequence type, high heat input, submerged arc welding process. It will also be seen that the welding heat input requirements are considerably low as compared with those of the tandem sequence, submerged arc welding process and the heat input is almost as low as that of the MIG welding process employing a small diameter electrode wire. It is also evident that according to the present invention the groove angle can be reduced as compared with those of the conventional processes thus reducing the amount of the weld metal and this also results in an improved efficiency.

Table 2 shows the results of the comparative tests conducted on the properties in the weld metals produced by the welding method of this invention, the tandem sequence high heat input submerged arc welding process and the small wire MIG welding process.

Table 2

| Welding process | Tested property | Weld metal | Welding heat affected zone |
|---|---|---|---|
| Method of the invention | Impact value (−80° F) (Kg.m) | 13.5 | 15.8 |
|  | Maximum hardness (Hv 10) | 242 | 254 |
| Conventional method, Tandem sequence submerged arc welding process | Impact value (−80° F) (Kg.m) | 7.0 | 2.1 |
|  | Maximum hardness (Hv 10) | 260 | 270 |
| Conventional method, small wire MIG welding process | Impact value (−80° F) (Kg.m) | 8.4 | 10.2 |
|  | Maximum hardness (Hv 10) | 392 | 328 |

Figure 6:
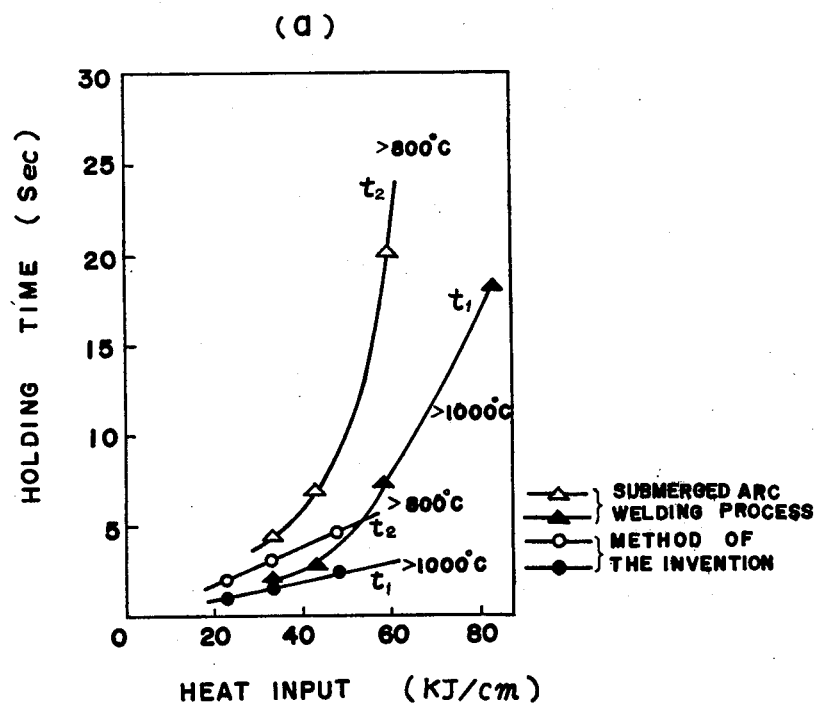
FIG. 6(a) is a diagram showing the results of the tests conducted on the relationship between the welding heat cycle and the welding heat input.
FIG. 6(b) is a schematic diagram showing the temperature measuring position used in the tests of FIG. 6(a).
FIG. 6(c) is a heat cycle diagram showing the manner in which the holding time was measured.
Figure 6:
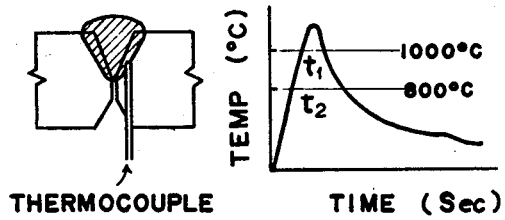

It will be seen from the above Table 2 that not only the impact properties in the weld metal made by the welding method of this invention were superior, but also the impact properties in the welding heat affected zone which have heretofore been considered as the most serious problem encountered when the conventional submerged arc welding process was used were improved considerably. This is due to the fact that the welding heat input is reduced as compared with that of the submerged arc welding process and that, as will be seen from the graph of FIG. 6(a) showing the relationship between the welding heat cycle and the welding heat input, the time during which the weld metal was held at elevated temperatures was reduced considerably according to the welding method of this invention. Further, in accordance with the present invention, the maximum hardness of the heat affected zone was reduced as compared with that obtained with the conventional small wire MIG welding process, namely, the maximum hardness was decreased without deteriorating the impact properties in the heat affected zone. Thus, it will be seen that this was accomplished by the fact that the bead deposited by the leading electrode was subjected to the effects of slow cooling and tempering and the trailing electrode was subjected to the preheating effects.

EXAMPLE 2

An aluminum killed steel having a thickness of 20 mm and formed with a groove having a groove angle of 40° and root face of 5 mm was subjected to a one-side welding by the method of this invention. The welding was accomplished by using as the electrode a single electrode wire of 3.2 mm$\phi$, a mixed gas comprising essentially of argon mixed with carbon dioxide gas ($CO_2$ volume ratio was 10%) as the shielding gas and operating the electrode under the following conditions: welding current, 850 amp; arc voltage, 31 volts; and welding speed 600 mm/min. The following Table 3 shows the results of the impact tests on the weld joint metal deposited by this welding.

Table 3

|  | Bond | 1 mm from the bond | 3mm from the bond |
|---|---|---|---|
| VE-46° C (Kg.m) | 10.5 | 13.1 | 18.9 |
|  | 9.3 | 17.5 | 26.4 |
|  | 9.7 | 18.3 | 25.4 |

It will be seen from the above Table 3 that the excellent properties were obtained in the weld zone made by the single electrode welding according to the method of this invention.

It will thus be seen from the foregoing description that in accordance with the welding method of this invention, the high speed, high efficiency welding can be accomplished with reduced heat input requirement and therefore by applying the welding method of the invention to the shop welding which has heretofore been used as the mass production process for the manufacture of large diameter tubes for very low temperature line pipes it is possible to produce weld joints having excellent properties and characteristics with such a high efficiency as comparable with that of the conventional tandem sequence type submerged arc welding process. Thus, the present invention has a very great industrial utility.

What is claimed is:

1. A method of high speed and large current gas shielded electric arc welding of steel using a mixture of inert gas and active gas as shielding gas, comprising the steps of: using at least one solid wire consumable electrode of low alloy steel material with a diameter substantially between 3.0 mm and 6.4 mm; feeding said electrode with a welding current of from 600 to 1500 amperes; supplying a shielding gas of from 50 to 200 l/min per electrode so as to shield an arc generated; and adjusting an arc voltage within a range of substantially from 23 to 36 volt.

2. The method according to claim 1, wherein the welding speed is substantially from 600 to 1,200 mm/min.

3. The method according to claim 1, wherein a plurality of electrodes are arranged spaced at a distance of 10 to 100 cm from one another.

4. The method according to claim 1 including the step of arranging a plurality of electrodes spaced at a distance of 10 to 100 cm from one another, the welding speed being substantially from 600 to 1,200 mm/min.

* * * * *